United States Patent
Reynolds et al.

(10) Patent No.: US 10,837,427 B2
(45) Date of Patent: Nov. 17, 2020

(54) WIND TURBINE BEARING REMOVAL AND INSTALLATION DEVICE AND METHOD

(71) Applicant: Barnhart Crane and Rigging Co., Memphis, TN (US)

(72) Inventors: Kevin Reynolds, Millington, TN (US); John Clark, Knoxville, TN (US); Stephen Warren, Memphis, TN (US); Thomas A. Pepin, III, Hernando, MS (US)

(73) Assignee: Barnhart Crane And Rigging Co., Memphis, TN (US)

( * ) Notice: Subject to any disclaimer, the term of this patent is extended or adjusted under 35 U.S.C. 154(b) by 0 days.

(21) Appl. No.: 16/054,449

(22) Filed: Aug. 3, 2018

(65) Prior Publication Data

US 2019/0040848 A1  Feb. 7, 2019

Related U.S. Application Data

(60) Provisional application No. 62/540,691, filed on Aug. 3, 2017.

(51) Int. Cl.
| | |
|---|---|
| *F03D 80/50* | (2016.01) |
| *B23P 6/00* | (2006.01) |
| *B23P 19/10* | (2006.01) |
| *F03D 13/10* | (2016.01) |
| *F03D 80/70* | (2016.01) |

(52) U.S. Cl.
CPC .............. *F03D 80/50* (2016.05); *B23P 6/002* (2013.01); *B23P 19/10* (2013.01); *B23P 6/00* (2013.01); *F03D 13/10* (2016.05); *F03D 80/70* (2016.05); *F05B 2230/70* (2013.01); *F05B 2240/916* (2013.01); *F05B 2260/79* (2013.01)

(58) Field of Classification Search
CPC .......... F03D 80/50; F03D 13/10; F03D 80/70; B23P 19/10; B23P 6/002; B23P 6/00; F05B 2230/70; F05B 2260/79; F05B 2240/916; B66C 1/108; B25B 11/00
USPC .............................................. 29/281.1, 281.6
See application file for complete search history.

(56) References Cited

U.S. PATENT DOCUMENTS

| | | | | |
|---|---|---|---|---|
| 4,762,456 A | * | 8/1988 | Nelson | B63B 27/00 212/307 |
| 5,645,265 A | * | 7/1997 | Shu | H02G 1/08 254/1 |
| 2008/0257844 A1 | * | 10/2008 | Llorente Gonzalez | F03D 13/10 212/179 |
| 2017/0045030 A1 | | 2/2017 | Senthoorpandan et al. | |

* cited by examiner

*Primary Examiner* — Lawrence Averick
(74) *Attorney, Agent, or Firm* — Baker Donelson (57) ABSTRACT

A device for removal and installation of a pitch bearing on a wind turbine having a plurality of blades is provided, comprising a platform having a frame, wherein the platform includes a first bearing attachment member on a first side of the frame, and having a first pair of opposing bearing connectors matably engageable to the pitch bearing; a second bearing attachment member on a second side of the frame, and having a second pair of opposing bearing connectors matably engageable to the pitch bearing; and a rigging member attached to the frame, wherein the rigging member includes at least one cable bracket adapted to receive a lifting cable. A method of removal and installing a pitch bearing using the platform is also provided.

11 Claims, 6 Drawing Sheets

WIND TURBINE BEARING REMOVAL AND INSTALLATION DEVICE AND METHOD

CROSS-REFERENCE TO RELATED APPLICATIONS

This nonprovisional application claims priority under 35 U.S.C. 119 to U.S. Ser. No. 62/540,691, filed on Aug. 3, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

This invention relates to devices and methods used for the repairs to wind turbines, and more particularly to the removal and installation of pitch bearings used for wind turbine blades.

2. Description of Related Art

Current methods of replacing pitch bearings on wind turbines require the entire rotor assembly (hub, bearings, and blades) to be disconnected and lowered to the ground with a significantly larger and more expensive crane as well as a second tailing crane. The advantage of the present invention is that a smaller and less expensive crane can be used because the heaviest lift is approximately one-third as much as the weight of the entire rotor.

Other methods that involve removing a single blade and bearing at a time require the unbalanced rotor, with only two blades installed, to be rotated such that the bearing to be replaced is at the twelve o'clock position. This is to allow access for workers to disconnect and reconnect the bearing from the hub. Rotating an unbalanced rotor is not possible for some turbine manufacturers and takes a significant amount of time. The present invention eliminates the need to rotate the unbalanced rotor and allows quick access to the studs that mount the bearing to the hub. The platform described herein also is equipped with all of the tooling needed to replace the bearings, which eliminates the time and effort required to manually move the tooling to the top of the hub.

Therefore, there is a need for a device and method of changing a pitch bearing for a wind turbine blade, which: (a) does not require moving the entire rotor to the ground, (b) does not require rotation of the unbalanced rotor once the blade is removed, (c) allows more efficient use of cranes to replace the bearing, and (d) provides a platform for moving the old and new bearings to and from the rotor, and for enabling convenient access to all tools necessary to perform such work.

SUMMARY OF THE INVENTION

A device for removal and installation of a pitch bearing on a wind turbine having a plurality of blades is provided, comprising a platform having a frame, wherein the platform includes a first bearing attachment member on a first side of the frame, and having a first pair of opposing bearing connectors matably engageable to the pitch bearing; a second bearing attachment member on a second side of the frame, and having a second pair of opposing bearing connectors matably engageable to the pitch bearing; and a rigging member attached to the frame, wherein the rigging member includes at least one cable bracket adapted to receive a lifting cable.

In a preferred embodiment, each of the first and second bearing attachment members is adjustable in length.

In another embodiment, the position of at least one bearing connector of the first pair of bearing connectors is adjustable on the first bearing attachment member, and the position of at least one bearing connector of the second pair of bearing connectors is adjustable on the second bearing attachment member.

In a further embodiment, the rigging member is attached to the first bearing attachment member and the second bearing attachment member.

Preferably, the position of the cable bracket on the rigging member is adjustable.

In a more preferred embodiment, the rigging member includes at least three cable brackets, wherein the position of each of the cable brackets on the rigging member is adjustable.

The device may further include at least two or more extendable stabilizers, at least one electrical generator, a tool storage cabinet, and at least one extendable work platform, all mounted on the frame.

In another embodiment, each bearing connector includes a bearing adapter having a first end matable with a receiving member on the bearing connector, and a second end matable with the bearing.

A method is also provided for removal and installation of a pitch bearing on a wind turbine having a plurality of blades, comprising the steps of providing a platform having a frame, wherein the platform includes a first bearing attachment member on a first side of the frame, and having a first pair of opposing bearing connectors matably engageable to the pitch bearing; a second bearing attachment member on a second side of the frame, and having a second pair of opposing bearing connectors matably engageable to the pitch bearing; and a rigging member attached to the frame, wherein the rigging member includes at least one cable bracket adapted to receive a lifting cable; separating one of the plurality of blades from a wind turbine hub; attaching a replacement bearing to the first bearing attachment member; moving the platform in proximity to an old bearing on the hub, and attaching the platform to the old bearing using the second bearing attachment member; disconnecting the old bearing from the hub; repositioning the platform to align the replacement bearing to the hub, and connecting the replacement bearing to the hub; and disconnecting the platform from the replacement bearing.

In a more preferred embodiment, the method further comprises the step of, prior to the step of disconnecting the old bearing from the hub, adjusting the position of the cable bracket on the rigging member to compensate for a change in center of gravity of the platform resulting from attachment of the old bearing to the platform.

In a more preferred embodiment, the method further comprises the step of, prior to the step of disconnecting the platform from the replacement bearing, adjusting the position of the cable bracket on the rigging member to compensate for a change in center of gravity of the platform resulting from detachment of the platform from the replacement bearing.

In a more preferred embodiment, the method further includes the step of moving the platform away from the hub, and re-attaching the blade to the replacement bearing.

The above and other objects and features of the present invention will become apparent from the drawings, the description given herein, and the appended claims.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

FIGS. 1-1D illustrate a perspective view and detailed views of a preferred embodiment of the invention in the form of a bearing removal and installation platform used to replace the pitch bearing for a wind turbine blade.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The present invention relates to a device and method for changing a pitch bearing for a wind turbine blade. Generally, the device is a movable platform 10 that is capable of supporting both an old bearing 5 and a replacement bearing 6, where the platform 10 further includes a frame 11, opposing adjustable bearing attachment members 12, 13 for attaching to a pitch bearing 5, 6, adjustable cable brackets 14, an electrical generator 15, a tool storage cabinet 16, and various safety systems for protection of a worker. The platform 10 is described first, and then a detailed description of the method is provided.

Figure 3:
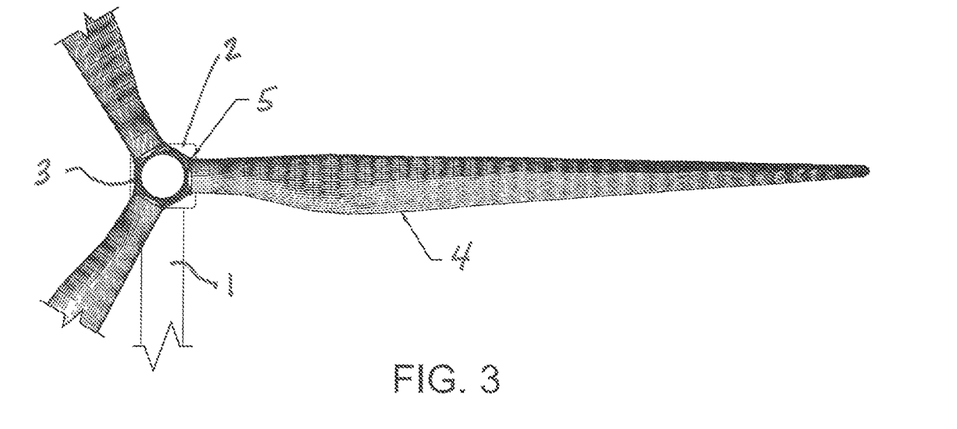
FIG. 3 illustrates a view of a wind turbine rotor showing the blade in the proper orientation prior to removal of the bearing.

Referring now to the figures, and particularly FIG. 3, a wind turbine comprises a tower 1, a nacelle 2, a rotor, where the rotor comprises a hub 3, three blades 4 (typically), and pitch bearings 5. The pitch of each blade 4 can be controlled as needed to suit wind conditions and power generation requirements, and the pitch rotation of the blade 4 is enabled by a pitch bearing 5 between the hub 3 and the blade 4. The nacelle 2 and hub 3 have internal spaces which allow workers 7 to make adjustments and repairs during the operational life of the wind turbine. One of the more difficult, expensive, and time-consuming repairs involves the replacement of the pitch bearing 5 which is attached in part to the hub 3 and in part to the base of the blade 4. However, the platform 10 described below, when used in accordance with the method of the present invention, makes this repair an easier and more efficient exercise.

Figures 1, 1A, 1B, 1C, 1D:
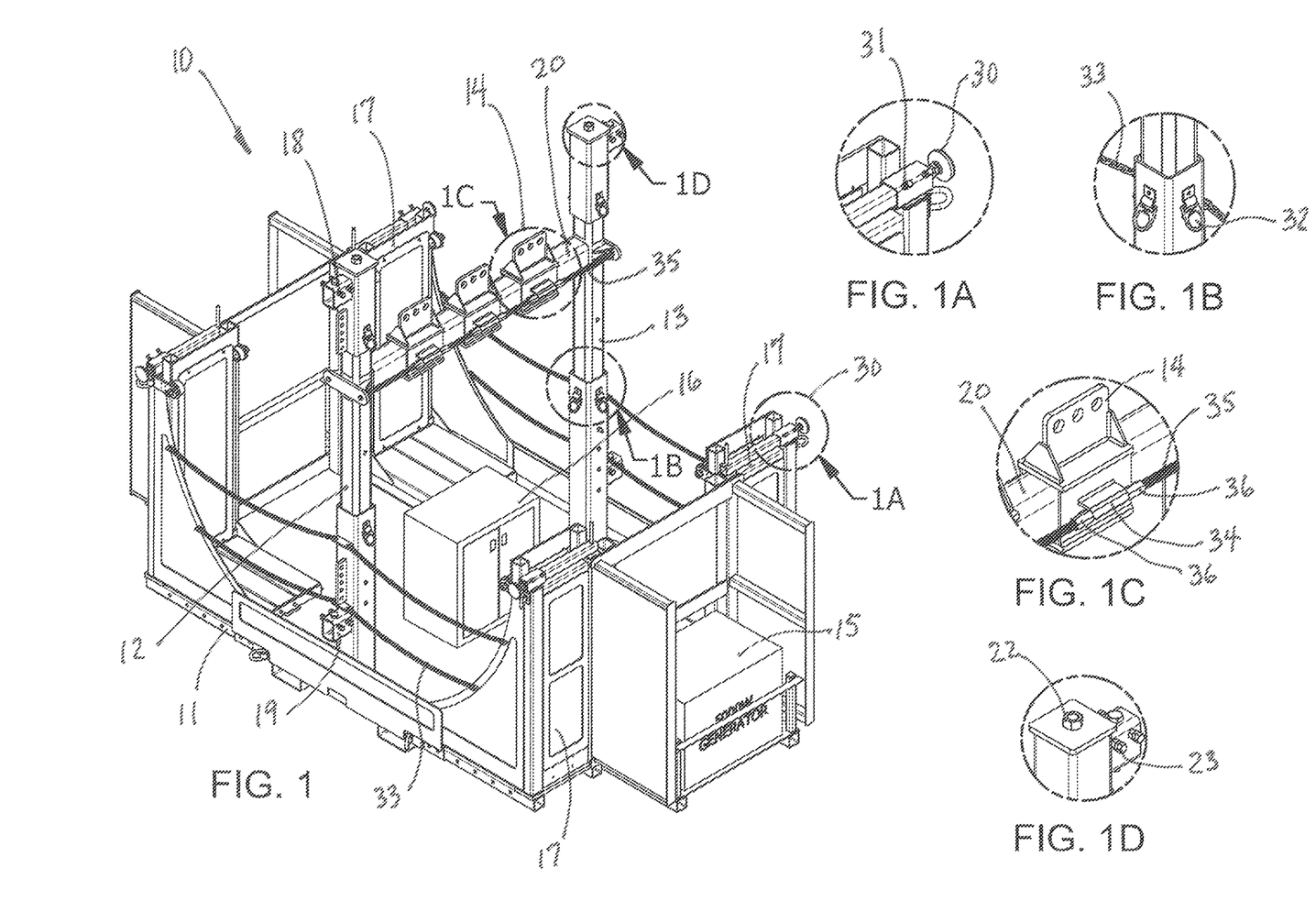
Figure 2:
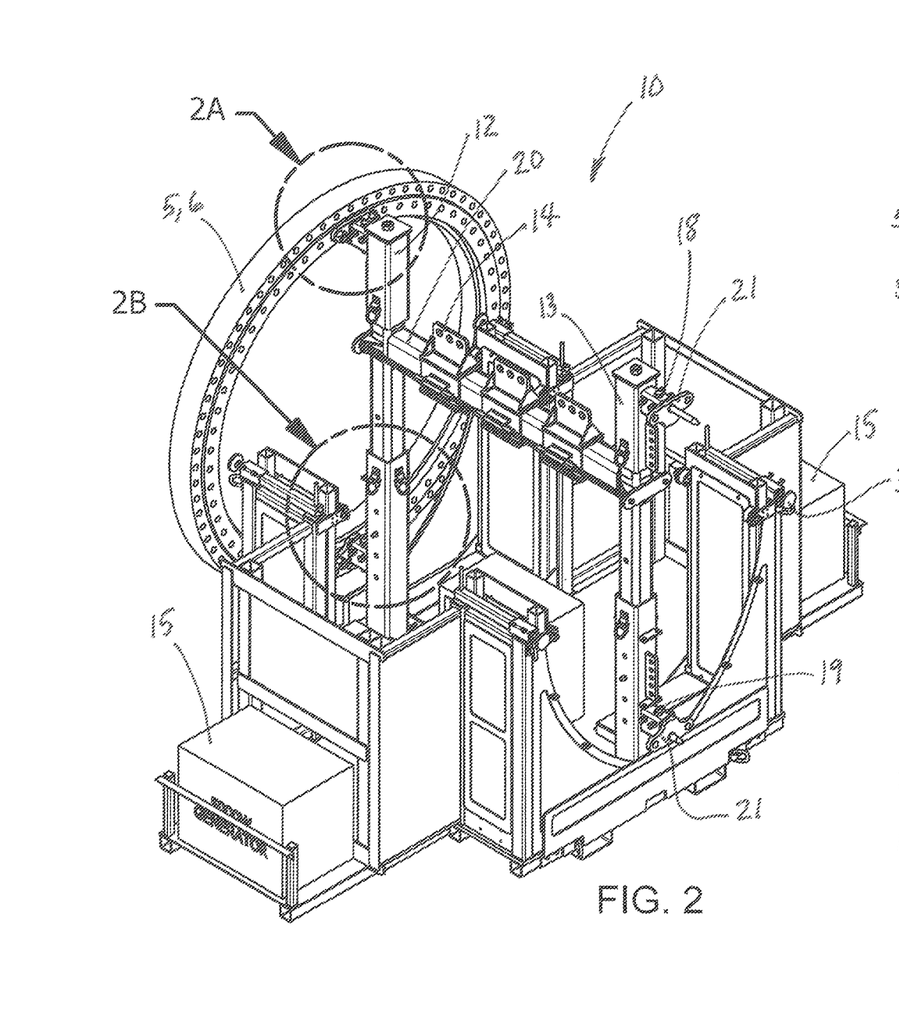
FIGS. 2-2B illustrate a perspective view and detailed views of the platform of FIG. 1 with a bearing attached to the platform.
Figure 2A:
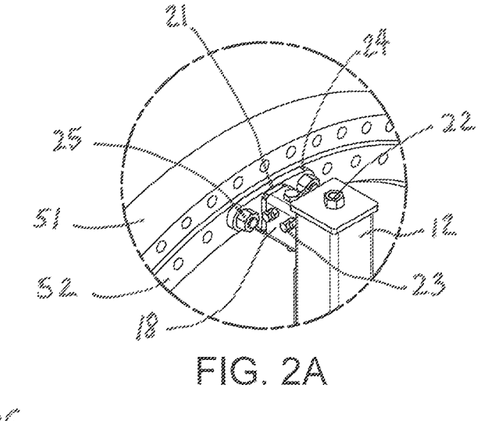
Figure 2B:
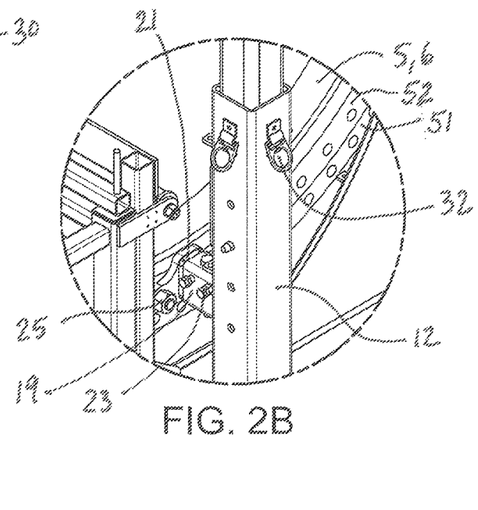

In a preferred embodiment, FIGS. 1-2B depict a platform 10 comprising a generally rectangular frame 11 with a floor to support a worker 7. Adjustable bearing attachment members 12, 13 are attached to opposing sides of the frame 11, such that each bearing member 12, 13 can be attached to a pitch bearing 5, 6 as explained further herein. The bearing members 12, 13 are also rigidly connected to one another by a cross member (or rigging member) 20 that includes at least three adjustable cable brackets 14 that are slidably disposed along the cross member 20. A tool cabinet 16 is provided on the floor of the platform 10 for securing all of the necessary tools required by worker 7 to complete the pitch bearing replacement. Powered extendible work platforms 17 are also provided on the frame 11 in all four corners to allow greater work areas as needed, and which are powered by two external generators 15 which are located on opposing sides of the platform 10.

Each of the bearing members 12, 13 includes an upper bearing adapter receiver 18 and a lower bearing adapter receiver 19 that are sized and shaped to receive the base of an adapter 21 that attaches to the bearing 5, 6, as will be explained below. Bearing members 12, 13 are each telescopingly adjustable in height so that the distance between the bearing adapter receivers 18, 19 can approximate the bolt circle of the specific pitch bearing 5, 6 that is being attached. As shown more particularly in FIGS. 1D and 2A, a fine adjustment screw 22 is provided on top of each bearing member 12, 13 which enables the worker 7 to fine tune the distance between bearing adapter receivers 18, 19 to precisely match the required diameter for attachment to the bearing 5, 6.

Platform 10 further includes telescoping stabilizing arms 30, shown best in FIGS. 1 and 1A, at each of the four corners of platform 10. Each stabilizing arm 30 can be extended and adjusted as necessary to contact surfaces outside of the platform 10, such as the hub 3, in order to prevent the platform 10 from any undesirable movement when a fixed position is required prior to attachment of the platform 10 to the hub 3 has will be explained below. The length of each stabilizing arm 30 can be fixed by set screws 31 by worker 7.

A plurality of tie-off points 32, best shown in FIG. 1B, are also provided on each of the bearing members 12, 13 to allow rigging and tag line attachment as needed by worker 7 for safety reasons. Also, safety chains 33 are provided across open areas of the platform 10 as needed.

As shown in more detail in FIG. 1C, each of the three cable brackets 14 includes several holes for connection to cables from a crane, and each bracket 14 is slidably disposed along cross member 20. Each bracket 14 includes a pair of locking flanges 34 which surround threaded rods 35 extending parallel to opposing sides of cross member 20, such that the precise position of the cable bracket 14 can be set by threadably tightening a pair of locking nuts 36 along threaded rod 35 to capture the locking flanges 34. Such adjustment is important as will be explained below for setting the best location along cross member 20 based on the center of gravity (CG) of the platform 10 at different steps in the repair process.

FIG. 2 shows platform 10 with a bearing 5, 6 attached to bearing member 12. It is important to understand that platform 10 is symmetrical, because bearing 5, 6 as shown in FIG. 2 could be the old bearing 5 or the replacement bearing 6, depending what step is being accomplished in the repair process as will be explained. Prior to the replacement process described below, and when the rotor is fully assembled, each bearing 5, 6, is secured to the hub 3 by numerous bearing studs inserted through holes in its outer race 51. Blade 4 is secured to the inner race 52 of the bearing 5, 6 in a similar manner by blade studs which are inserted from inside the hub 3.

As shown in FIG. 2A, when the upper portion of the inner race 52 of bearing 5, 6 is attached to the appropriate bearing member 12, 13, the base of the adapter 21 is inserted into the bearing adapter receiver 18. Set screws 23 are used to lock the adapter 21 within the bearing adapter receiver 18. The adapter 21 includes flanges 24 that are attached to the inner race 52 of bearing 5, 6 using bolts and nuts 25. As shown in FIG. 2B, an identical arrangement is used to secure the lower portion of bearing 5, 6 to the lower bearing adapter receiver 19 on bearing member 12, 13, as will be understood.

Having described the important features of the platform 10, a description of the method of replacement of pitch bearing 5 using the platform 10 is provided with reference to FIGS. 3-13. As indicated in FIG. 3, the entire rotor is rotated and locked into a position that results in blade 4 being in a three o'clock position, i.e. effectively a horizontal orientation.

Figure 4:
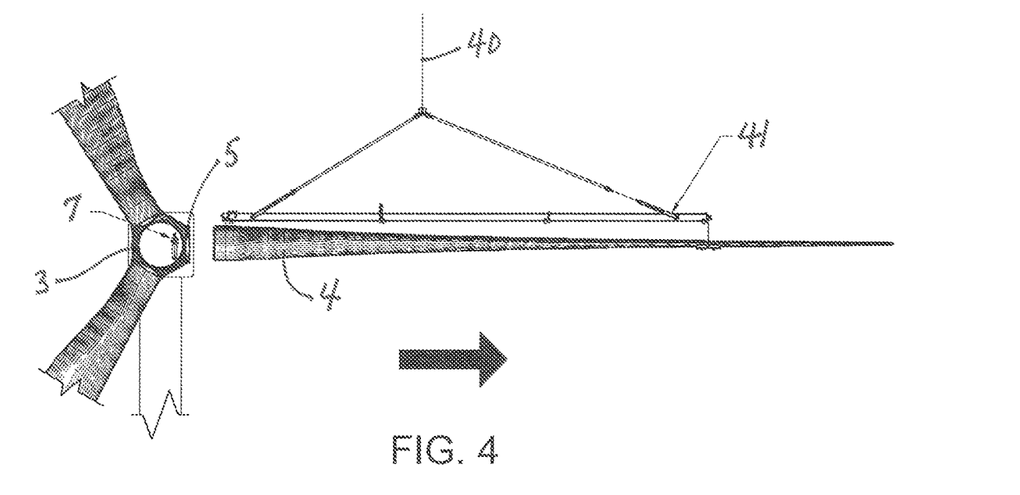
FIG. 4 illustrates the blade separated from the hub and suspended from the crane in preparation for removal of the bearing.

As shown in FIG. 4, a crane line 40 is used with a blade bar 41 to secure the blade 4 in preparation for separation from its pitch bearing 5. A worker 7 resides inside hub 3 and removes the blade studs which attach blade 4 to the inner race 52 of the old pitch bearing 5, and then the blade 4 is moved away from the hub 3, lowered to the ground, and then disconnected from the crane line 40.

Figure 5:
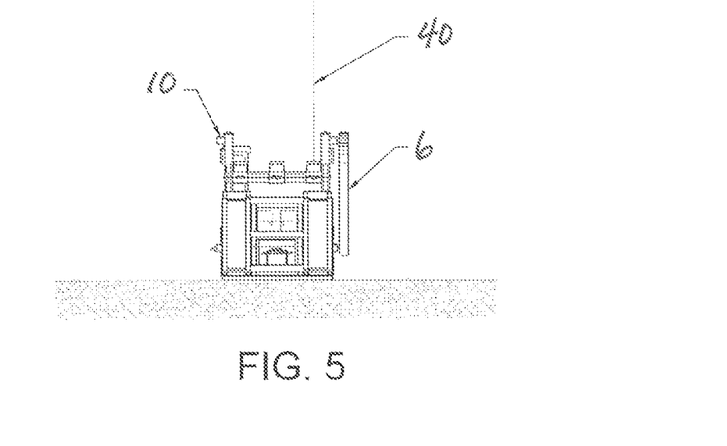
FIG. 5 illustrates the platform of FIG. 1 on the ground with the replacement bearing attached, while connected to the crane prior to raising the platform.
Figure 6:
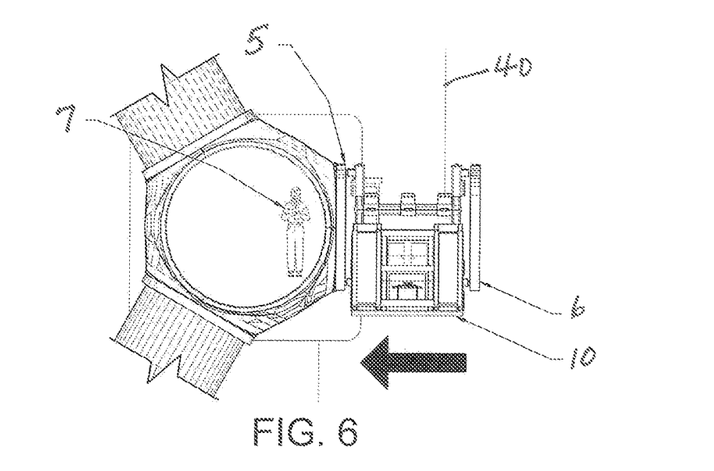
FIG. 6 illustrates the platform being attached to the old bearing on the hub by a worker inside the hub.

As shown in FIG. 5, the crane line 40 is then secured to cable bracket 14 on platform 10 while at ground level, and the replacement bearing 6 is attached to the platform 10 as described above. The precise location of cable bracket 14 along cross member 20 is determined and set based on the combined CG of the platform 10 with the replacement bearing 6. The unmanned platform 10 with replacement bearing 6 is then raised by the crane line 40 to a point directly across from hub 3, as shown in FIG. 6, where worker 7 secures the platform 10 to the inner race 52 of the old pitch bearing 5 using one of the bearing members 12, 13 and adapters 21 as previously described with respect to FIGS. 1D and 2A.

Figure 7:
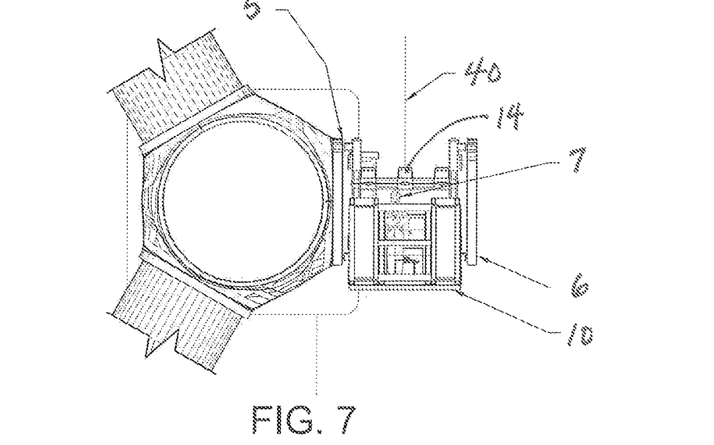
FIG. 7 illustrates the removal of the bearing studs from the bearing by a worker on the platform.

Now that the platform 10 is in a secure position, and as shown in FIG. 7, worker 7 is able to move from inside hub 3 and onto platform 10. While on platform 10, worker 7 reconnects the crane line 40 to a more centrally located cable bracket 14 which anticipates a later rotational move while platform 10 carries both old bearing 5 and replacement bearing 6. Still on platform 10, worker 7 now removes the bearing studs which secure the outer race 51 of the old pitch bearing 5 to the hub 3.

Figure 8:
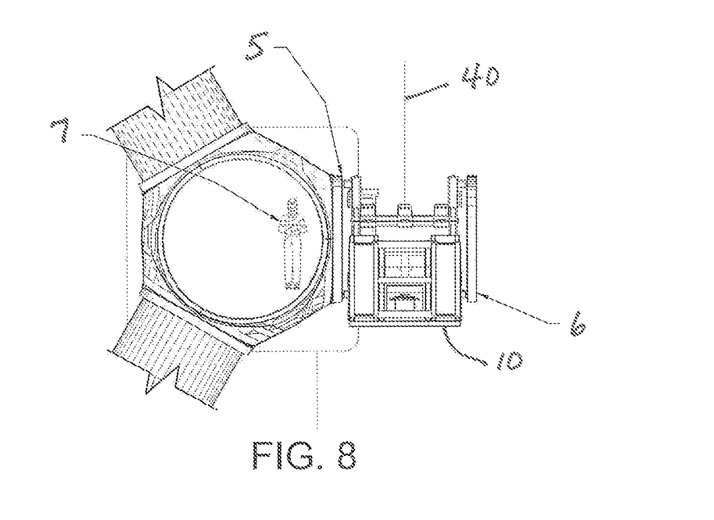
FIG. 8 illustrates the disconnection of the bearing from the hub by a worker inside the hub.
Figure 9:
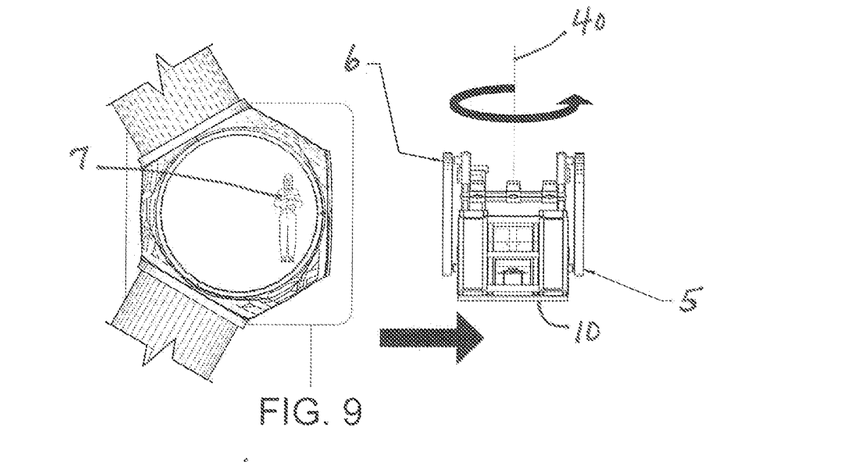
FIG. 9 illustrates the platform with the old and replacement bearings attached, and the platform being rotated to position the replacement bearing in alignment with the hub.
Figure 10:
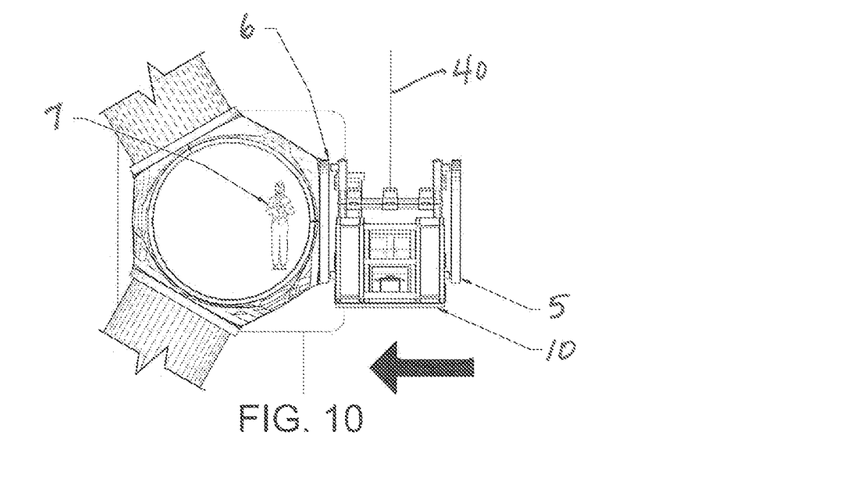
FIG. 10 illustrates the replacement bearing being attached to the hub by a worker inside the hub.

As shown in FIG. 8, once the majority of the bearing studs are removed, worker 7 moves back into the hub 3 and removes the remaining bearing studs that secure the old bearing 5 to the hub 3. The old bearing 5 which is secured to the platform 10 is now freed from the hub 3, and platform 10 is maintained in its vertical position by crane line 40 as it carries both old bearing 5 and replacement bearing 6. In accordance with FIG. 9, the platform 10 is now rotated 180 degrees, which places the replacement bearing 6 into position near hub 3 for installation. As shown in FIG. 10, the replacement bearing 6 is aligned, and worker 7 works from inside hub 3 to install several of the bearing studs to preliminarily secure the outer race 51 of the replacement bearing 6 to the hub 3.

Figure 11:
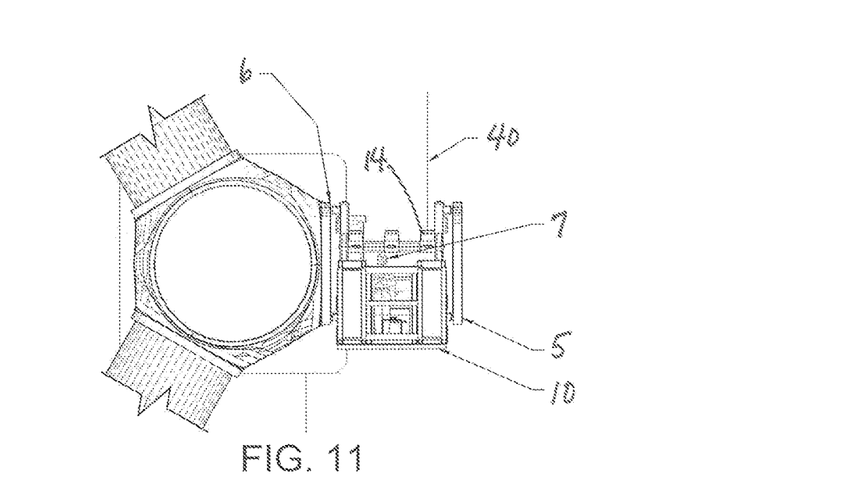
FIG. 11 illustrates the installation of the bearing studs to the bearing by a worker on the platform.
Figure 12:
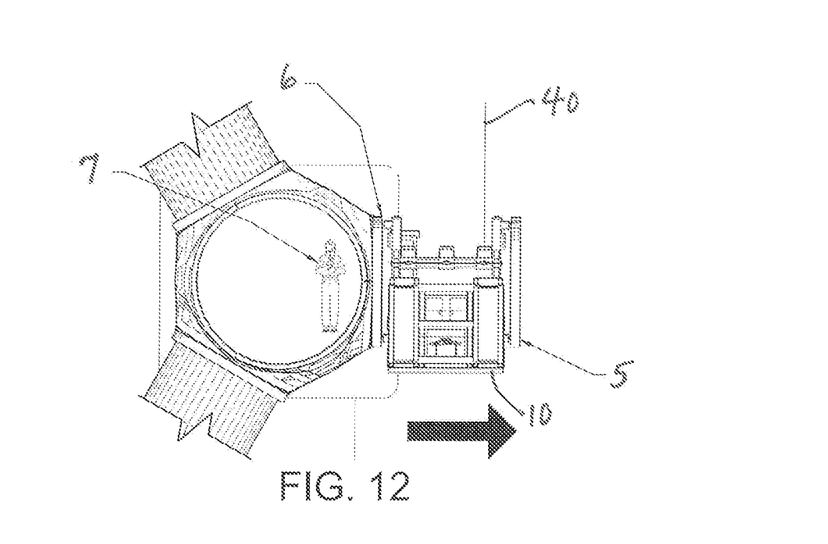
FIG. 12 illustrates the platform being detached from the replacement bearing by a worker inside the hub.
Figure 13:
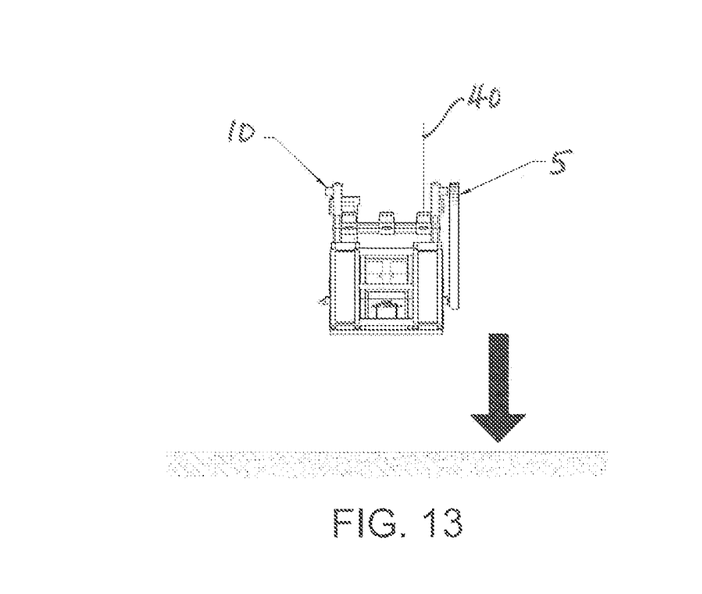
FIG. 13 illustrates the platform with the old bearing attached being lowered back to the ground by the crane.

As shown in FIG. 11, and after the replacement bearing 6 has been preliminarily secured to the hub 3, worker 7 moves back to the platform 10 and reconnects the crane line 40 to the third cable bracket to account for the eventual change in CG after the replacement bearing 6 is disconnected from platform 10. Worker 7 than installs the remaining bearing studs to secure the outer race 51 of the replacement bearing 6 to the hub 3. Once this is accomplished, worker 7 moves back inside the hub 3 and disconnects the platform 10 from the replacement bearing 6 as shown in FIG. 12. Finally, the platform 10 carrying the old bearing 5 is lowered back to the ground by crane line 40 as in FIG. 13. The crane line 40 is then disconnected from the platform 10 and reconnected to blade bar 41 to reinstall the blade 4 to the inner race 52 of the replacement bearing 6.

The description and illustrations are by way of example only. While the description above makes reference to various embodiments, it should be understood that many changes and modifications can be made without departing from the scope of the disclosure. Many more embodiments and implementations are possible within the scope of this invention and will be apparent to those of ordinary skill in the art. The invention is not limited to the specific details, representative embodiments, and illustrated examples in this description.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

We claim:

1. A device for removal and installation of pitch bearings on a wind turbine having a plurality of blades, comprising:
   a platform having a frame, wherein the platform includes:
   a first bearing attachment member on a first side of the frame, and being operatively connected to a first pair of opposing bearing connectors each matably engageable to a first pitch bearing;
   a second bearing attachment member on a second side of the frame, and being operatively connected to a second pair of opposing bearing connectors both matably engageable to a second pitch bearing; and
   a rigging member attached to the frame, wherein the rigging member includes at least one cable bracket adapted to receive a lifting cable.

2. The device of claim 1, wherein each of the first and second bearing attachment members is adjustable in length.

3. The device of claim 1, wherein the position of at least one bearing connector of the first pair of bearing connectors is adjustable on the first bearing attachment member, and wherein the position of at least one bearing connector of the second pair of bearing connectors is adjustable on the second bearing attachment member.

4. The device of claim 1, wherein the rigging member is attached to the first bearing attachment member and the second bearing attachment member.

5. The device of claim 1, wherein the position of the cable bracket on the rigging member is adjustable.

6. The device of claim 1, wherein the rigging member includes at least three cable brackets, and wherein the position of each of the cable brackets on the rigging member is adjustable.

7. The device of claim 1, further including at least two or more extendable stabilizers mounted to the frame.

8. The device of claim 1, further including at least one electrical generator mounted to the frame.

9. The device of claim 1, further including a tool storage cabinet mounted to the frame.

10. The device of claim 1, further including at least one extendable work platform mounted on the frame.

11. The device of claim 1, wherein each bearing connector includes a bearing adapter having a first end matable with a receiving member on the bearing connector, and a second end matable with the bearing.

* * * * *